United States Patent
Arizpe

[19]
[11] Patent Number: 6,009,223
[45] Date of Patent: Dec. 28, 1999

[54] BRACKET ASSEMBLY FOR STRAIN RELIEF OF OPTICAL FIBER JUMPERS

[75] Inventor: Ronald E. Arizpe, Watauga, Tex.

[73] Assignee: Siecor Corporation, Hickory, N.C.

[21] Appl. No.: 08/922,006

[22] Filed: Sep. 2, 1997

[51] Int. Cl.⁶ .................................................. G02B 6/36
[52] U.S. Cl. ........................... 385/134; 385/135; 385/136
[58] Field of Search .................................... 385/134–136

[56] References Cited

U.S. PATENT DOCUMENTS

| | | | |
|---|---|---|---|
| Re. 35,030 | 8/1995 | Siemon et al. | 439/532 |
| 4,080,035 | 3/1978 | Clark et al. | 439/471 |
| 5,575,665 | 11/1996 | Shramawick et al. | 439/49 |
| 5,640,482 | 6/1997 | Barry et al. | 385/135 |
| 5,731,546 | 3/1998 | Miles et al. | 174/135 |

*Primary Examiner*—John D. Lee
*Assistant Examiner*—Michael J. Stahl

[57] ABSTRACT

A bracket assembly is provided for managing and strain relieving jumpers exiting an optical hardware cabinet. The bracket has a length portion and at least one fanning finger block mounted thereon to define a line of routing spaces for jumpers. The bracket further has at least one tie portion located at an end of the length portion and extending laterally of the length portion defining a free edge. The tie portion defines holes suitable for threading a cable tie therethrough. The tie portion is located relative to the fanning finger blocks such that jumpers routed through the fanning fingers can be gathered together over the tie portion and secured thereto with a cable tie threaded through one of the holes. The bracket has a mounting portion extending downward from the bracket to provide a clearance space to allow for threading of a cable tie through the hole.

6 Claims, 1 Drawing Sheet

BRACKET ASSEMBLY FOR STRAIN RELIEF OF OPTICAL FIBER JUMPERS

FIELD OF THE INVENTION

The present invention relates to a bracket that provides for both strain relieving and managing of optical fiber jumpers.

BACKGROUND OF THE INVENTION

Fiber distribution frames and wall mount cabinets are commonly used items of optical hardware for the interconnection of optical fiber jumpers with other jumpers and optical fiber cables. One common design of optical hardware includes connector panels that may include 6 to 12 connector adapters that receive optical fiber connectors in a mating relationship. A cabinet or frame may include several of these panels so that anywhere up to a hundred or so jumpers may be extending from the hardware. These jumpers then need to be routed to other locations. The orderly management of these jumpers is needed to prevent a "rat's nest" from forming on the optical hardware and allow for access and tracing of the jumpers. Optical hardware commonly uses rows of flexible fingers that define routing spaces for jumpers to aid in management of the jumpers. However, a common drawback of some optical hardware is the lack of any strain relief for the jumpers. Therefore a need exists for a means to provide for strain relief of optical fiber jumpers while still allowing for management of the jumpers. Additionally, because space is typically at a premium in optical hardware, a need exists for the strain relieving to be provided in a manner that takes up minimal space in the hardware and that is easy to use by installers of the optical hardware.

SUMMARY OF THE INVENTION

One aspect of the present invention provides a bracket assembly for both managing and strain relieving optical fiber jumpers. The assembly comprises a bracket with a length portion defining a top surface extending longitudinally between a first end and a second end and having a width between a first edge and a second edge. The bracket has a tie portion extending laterally from the first edge at the first end to define a free edge. The tie portion defines at least one hole adjacent the free edge defining a web between the hole and the free edge. The hole is sized to allow threading of a cable tie therethrough. The assembly also has at least one fanning finger block mounted on the top surface and has a plurality of fanning fingers defining a line of routing spaces along the top surface for receiving jumpers routed therethrough. The hole in the tie portion is located relative to the line of routing spaces such that it would be disposed generally underneath a jumper that is routed through the routing spaces in a direction generally perpendicular to the length portion from the side of the bracket opposite the tie portion and curved within minimum bend radius constraints to run parallel with the length portion and over the tie portion.

Another aspect of the present invention provides a bracket assembly for strain relieving optical fiber jumpers. The assembly comprises a bracket having a planar tie portion having a free edge. The tie portion defines a series of holes therethrough and each hole is sized to allow threading of a cable tie therethrough. The free edge defines a series of cut-outs adjacent the series of holes and defines a web between each hole and its respective cut-out. The bracket also has a mounting portion extending perpendicularly from the tie portion terminating at a free end for mounting to a suitable surface so as to define a clearance space sufficient to allow threading of a cable tie through one of the holes to tie jumpers to the top of the tie portion when the bracket is installed on the surface.

DETAILED DESCRIPTION OF THE PREFERRED EMBODIMENTS

Figure 1:
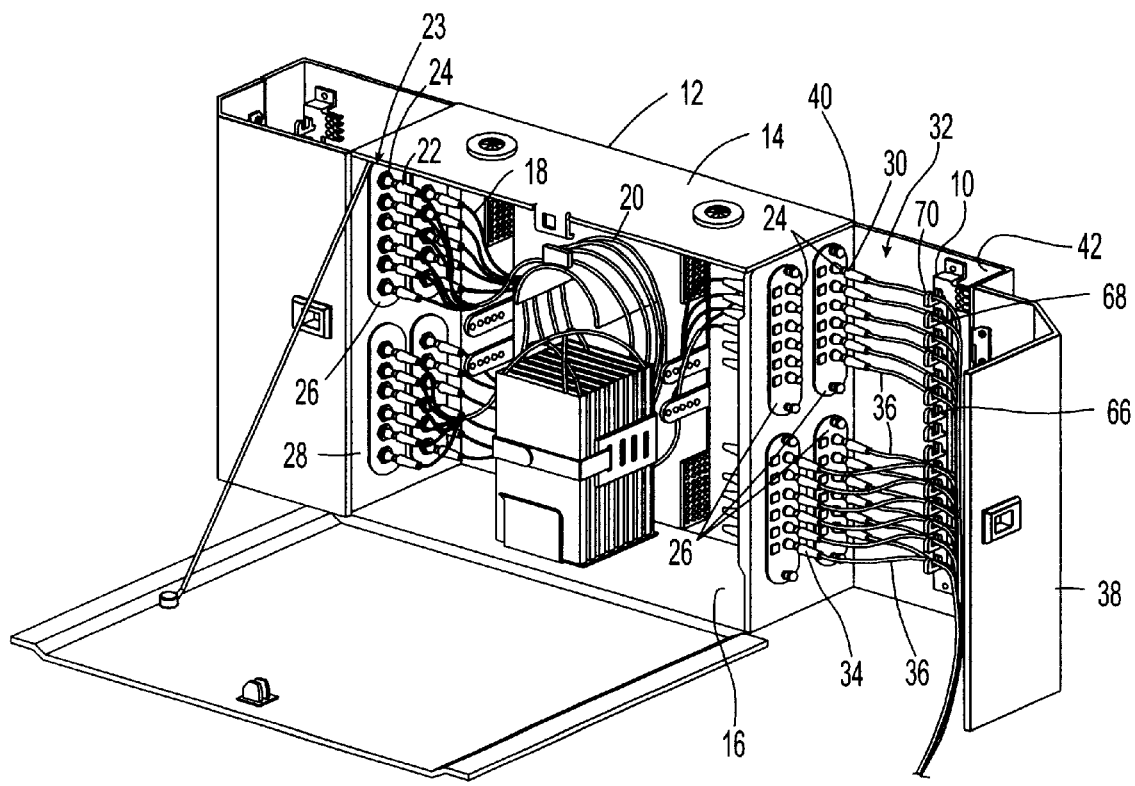
FIG. 1 is a perspective view of a wall mount optical hardware cabinet containing the preferred embodiment of the bracket of the present invention.
Figure 2:
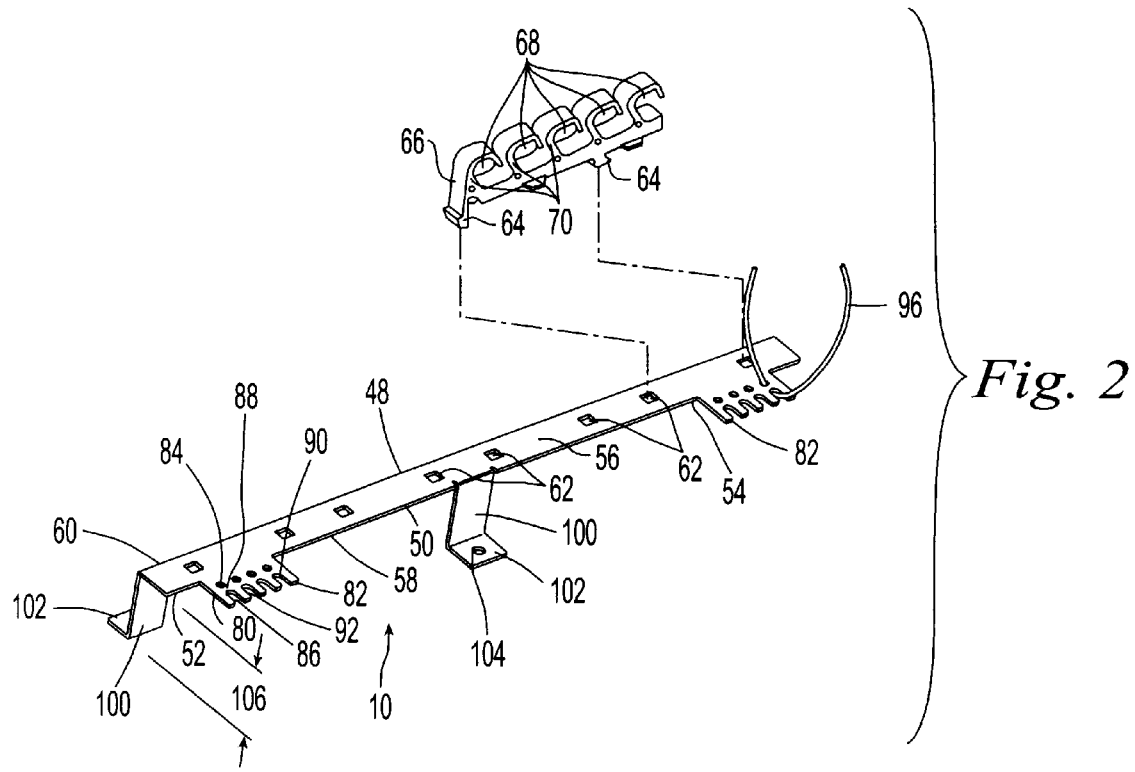
FIG. 2 is an exploded perspective view of the preferred embodiment of the bracket of the present invention.

With reference to FIGS. 1–2, the preferred embodiment of bracket assembly 10 of the present invention is shown. FIG. 1 shows wall mount cabinet 12 as an example application for bracket assembly 10. Cabinet 12 has housing 14 defining interior 16 where optical fibers 18 from cables 20 are separated out, connectorized with connectors 22 and connected to first side 23 of connector adapters 24 on adapter panels 26 that are removably mounted to side walls 28 of housing 14. Second side 30 of adapters 24 extend outside of housing 14 into routing channel 32 to which connectors 34 of jumpers 36 are connected. Jumpers 36 are then routed away from panels 26 through channel 32 to another location. Door 38 closes over channel 32 to protect the connections of jumpers 36 to adapters 24. Housing 14 has back side 40 that extends beyond housing 14 and has surface 42 outside of housing 14.

Bracket assembly 10 of the present invention is mounted to surface 42, oriented longitudinally and spaced from panels 26 to be located at a point underneath where jumpers 36 will pass as they are routed from panels 26 and out channel 32 while following minimum bend radius requirements of optical fiber jumpers. The longitudinal extent of bracket assembly 10 is generally co-extensive with the longitudinal extent of the array of adapters 24.

Bracket assembly 10 comprises bracket 48 with length portion 50 with first end 52 and second end 54 opposite thereto. Length portion 50 also has top surface 56, first edge 58 and second edge 60. Top surface 56 defines mounting holes 62 therethrough for receiving projections 64 of fanning finger blocks 66 snap-fit therethrough. Fanning finger blocks 66 are known in the art and are commonly used in optical hardware to manage the routing of jumpers. One or more blocks 66 are mounted in line along top surface 56 to define a line of routing spaces 68 between successive curved fingers 70. Bracket assembly 10 is located on surface 42 such that the line of routing spaces 68 can receive jumpers 36 therethrough in a managed fashion.

Bracket 48 has tie portions 80 that extend from first edge 58 defining free edge 82 laterally removed from length portion 50 of bracket 48. Tie portions 80 are located at first end 52 and second end 54 and extend in a direction perpendicular to the length portion of bracket 48 such that tie portions will be disposed underneath jumpers that are running generally parallel to the length of bracket 10 after being routed through routing spaces 68 and then curved downward (or upward) to exit channel 32.

Tie portion 80 defines line of at least one hole 84 and line of at least one cut-out 86 in free edge 82. The two lines are generally parallel to each other and to the length of bracket 48 and each hole 84 is adjacent a respective cut-out 86 defining a web 88 between each hole and its respective cut-out 86. Holes 84 are sized to allow threading of a common cable tie 96 therethrough. Cut-outs 86 are preferably generally u-shapes and having a width generally the same as hole 84 to allow a cable tie 96 to be disposed through cut-out 86. Cut-outs 86 have curved end 90 and generally straight sides 92. Curved end 90 is placed as close to hole 84 to define a thin web 88.

In operation, jumpers 36 are routed through routing spaces 68 and curve to pass over a tie portion 80. A cable tie is threaded through one of the holes 84 and its respective cut-out 86 and wrapped around the jumpers and cinched closed to provide strain relief for the jumpers. With web 88 as thin as appropriate without compromising its strength the circumferential cinching area of the cable tie 96 around the jumpers is maximized. If one of the jumpers is snagged or pulled at a point outside of cabinet 12, the strain of such pull will be relieved at the cable tie 96 and tie portion 80 and will not be transferred to the connectors 34 and adapters 24. More than one cable tie 96 can be used if desired.

Cut-outs 86 are preferred because sides 92 of cut-outs 86 serve to confine the cable tie. As an alternative embodiment, cut-outs 86 could be eliminated and holes 84 moved closer to free edge 82 so that the thickness of web 88 is kept to a minimum to provide more circumferential cinching area for the cable tie. If web 88 is too large, the cinching of the cable tie 96 is not as effective. Web 88 is preferably as small as possible while maintaining sufficient strength of web 88 such that it will not break when a jumper is pulled or snagged inadvertently.

Bracket 48 preferably has mount portions 100 extending downward from bracket 10 and defining feet 102 with mounting holes 104 for mounting bracket assembly 10 to cabinet 12. By having mount portions 100 extending downward, they provide for clearance space 106 underneath tie portions 80 so that when bracket 10 is mounted there is room for an installer to thread the cable tie 96 through hole 84 and cut-out 86.

Although the present invention has been described with respect to a preferred embodiment, it should be understood that various changes, substitutions and modifications may be suggested to one skilled in the art and it is intended that the present invention encompass such changes, substitutions and modifications as fall within the scope of the appended claims.

That which is claimed is:

1. A bracket assembly for managing and strain relieving optical fiber jumpers, comprising:

(a) a bracket with a length portion defining a top surface extending longitudinally between a first end and a second end and having a width between a first edge and a second edge, the bracket having a tie portion extending laterally from the first edge at the first end to define a free edge, the tie portion defining at least one hole adjacent the free edge defining a web between the hole and the free edge, the hole sized to allow threading of a cable tie therethrough;

(b) at least one fanning finger block mounted on the top surface and having a plurality of fanning fingers defining a line of routing spaces along the top surface for receiving jumpers routed therethrough; and (c) the hole in the tie portion being located relative to the line of routing spaces such that it would be disposed generally underneath a jumper that is routed through the routing spaces in a direction generally perpendicular to the length portion from the side of the bracket opposite the tie portion and curved within minimum bend radius constraints to run parallel with the length portion and over the tie portion.

2. The bracket assembly of claim 1 wherein the free edge of the tie portion defines at least one cut-out adjacent the at least one hole such that the web is defined between the hole and the cut-out, the cut-out having a width to allow passage of a cable tie therethrough.

3. The bracket assembly of claim 2 wherein the bracket further comprises a second tie portion at the second end of the length portion.

4. The bracket assembly of claim 2 wherein the bracket further comprises mounting portions extending downwardly from the length portion and having a foot for mounting to a surface so as to define a clearance space underneath the tie portion.

5. A bracket assembly for strain relieving optical fiber jumpers, comprising:

(a) a bracket having a planar tie portion having a free edge, the tie portion defining a series of holes therethrough, each hole sized to allow threading of a cable tie therethrough, the free edge defining a series of cut-outs adjacent the series of holes and defining a web between each hole and its respective cut-out; and (b) the bracket having a mounting portion extending perpendicularly from the tie portion terminating at a free end for mounting to a suitable surface so as to define a clearance space sufficient to allow threading of a cable tie through a hole to tie jumpers to the top of the tie portion when the bracket is installed on the surface.

6. The bracket assembly of claim 5 wherein the bracket further comprises a length portion extending from the tie portion and further comprising at least one fanning finger block mounted to the top surface of the length portion defining a line of routing spaces for routing a plurality of jumpers from a direction perpendicular to the length portion, the series of holes spaced from the at least one fanning finger block such that the holes will be located underneath jumpers that are routed through the routing spaces and curved within bend radius constraints to run in a direction parallel to the length portion.

\* \* \* \* \*